(12) United States Patent  
Kayahara

(10) Patent No.: US 11,590,770 B2  
(45) Date of Patent: Feb. 28, 2023

(54) PRINTING APPARATUS AND PRINTING METHOD

(71) Applicant: SEIKO EPSON CORPORATION, Tokyo (JP)

(72) Inventor: Naoki Kayahara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/456,463

(22) Filed: Nov. 24, 2021

(65) Prior Publication Data

US 2022/0169040 A1  Jun. 2, 2022

(30) Foreign Application Priority Data

Nov. 27, 2020  (JP) .............................. JP2020-197296

(51) Int. Cl.
*B41J 3/407* (2006.01)
*B41J 29/393* (2006.01)
*H04N 1/387* (2006.01)

(52) U.S. Cl.
CPC ........... *B41J 3/4078* (2013.01); *B41J 29/393* (2013.01); *H04N 1/387* (2013.01)

(58) Field of Classification Search
CPC ........ B41J 3/4078; B41J 29/393; H04N 1/387
See application file for complete search history.

(56) References Cited

U.S. PATENT DOCUMENTS

| 7,876,471 B2* | 1/2011 | Tojo ..................... G06V 10/757 358/1.18 |
| 2003/0030686 A1 | 2/2003 | Abe et al. |
| 2004/0239705 A1 | 12/2004 | Arikita |
| 2005/0011386 A1 | 1/2005 | Brunet-Manquat |
| 2010/0194807 A1 | 8/2010 | Hirasawa et al. |
| 2010/0238459 A1 | 9/2010 | Yamazaki |
| 2017/0148154 A1 | 5/2017 | Nakao |
| 2019/0299598 A1* | 10/2019 | Yokota ................. B41J 2/04558 |

FOREIGN PATENT DOCUMENTS

| JP | H11-300949 A | 11/1999 |
| JP | 2007-313717 A | 12/2007 |
| JP | 2010-179544 A | 8/2010 |
| JP | 2017-096750 A | 6/2017 |
| WO | 2003/031190 A1 | 1/2005 |

* cited by examiner

*Primary Examiner* — Quang N Vo  
(74) *Attorney, Agent, or Firm* — Global IP Counselors, LLP

(57) ABSTRACT

A printing apparatus includes a pattern extracting unit for, based on a comparison between first image data representing a pattern and second image data generated by imaging a fabric transported, extracting a pattern region from the second image data, a printing image generation unit for arranging third image data representing an image to be printed overlaid on the pattern in accordance with a positional relationship between the pattern regions to generate printing image data, and a printing control unit for causing a printing unit to print the printing image data on the fabric transported.

6 Claims, 10 Drawing Sheets

| PATTERN REGION NAME | CENTER COORDINATES | |
|---|---|---|
| | X | Y |
| A1 | x1 | y1 |
| A2 | x2 | y2 |
| A3 | x3 | y3 |
| A4 | x4 | y4 |
| A5 | x5 | y5 |
| A6 | x6 | y6 |
| A7 | x7 | y7 |
| A8 | x8 | y8 |
| A9 | x9 | y9 |
| A10 | x10 | y10 |
| A11 | x11 | y11 |
| ⋮ | ⋮ | ⋮ |

FIG. 6

PRINTING APPARATUS AND PRINTING METHOD

The present application is based on, and claims priority from JP Application Serial Number 2020-197296, filed Nov. 27, 2020, the disclosure of which is hereby incorporated by reference herein in its entirety.

BACKGROUND

1. Technical Field

The present disclosure relates to a printing apparatus and a printing method.

2. Related Art

A technique has been known for searching an inspection target image for a candidate having similar characteristics to a model image obtained by imaging a good product serving as a model of the product (see JP 2017-96750 A).

Here, it is assumed that, when a fabric formed with a pattern is used as a printing medium, the pattern is extracted from a captured image obtained by imaging the fabric transported. In many cases, the patterns are periodically formed in the fabric, but distortion, and expansion and contraction (hereinafter, distortion, and the like) may be generated in the fabric being transported, and in the captured image, the respective patterns are not necessarily aligned methodically in a vertical direction or a lateral direction. In order to perform proper printing on the fabric, it is necessary to grasp positional relationships between the patterns in the fabric, but it was not easy to correctly grasp the positional relationships between the patterns extracted from the captured image due to effects of the distortion and the like described above.

SUMMARY

A printing apparatus includes a transport unit configured to transport a fabric formed with a pattern in a transport direction, an imaging unit configured to image the fabric transported by the transport unit, a printing unit configured to perform printing on the fabric transported by the transport unit, a pattern extracting unit configured to, based on a comparison between first image data representing the pattern and second image data generated by imaging the fabric by the imaging unit, extract a pattern region corresponding to the pattern in the second image data, a printing image generation unit configured to arrange third image data representing an image to be printed overlaid on the pattern in accordance with a positional relationship between the pattern regions extracted to generate printing image data, and a printing control unit configured to cause the printing unit to print the printing image data on the fabric, wherein the pattern extracting unit performs positional relationship identification processing for setting one of the pattern regions as a search source pattern region, setting, as a search destination pattern region, the pattern region successfully found in a certain range set at a position separated in a predetermined search direction from the search source pattern region by a predetermined distance, and storing information that a position of the search destination pattern region is adjacent in the search direction to the search source pattern region, and newly sets the search destination pattern region as the search source pattern region to perform the positional relationship identification processing.

A printing method includes a transport step for transporting a fabric formed with a pattern in a transport direction, an imaging step for imaging the fabric transported, a pattern extraction step for, based on a comparison between first image data representing the pattern and second image data generated by imaging the fabric, extracting a pattern region corresponding to the pattern in the second image data, a printing image generation step for arranging third image data representing an image to be printed overlaid on the pattern in accordance with a positional relationship between the pattern regions extracted to generate printing image data, and a printing step for printing the printing image data on the fabric transported, wherein the pattern extraction step performs positional relationship identification processing for setting one of the pattern regions as a search source pattern region, setting, as a search destination pattern region, the pattern region successfully found in a certain range set at a position separated in a predetermined search direction from the search source pattern region by a predetermined distance, and storing information that a position of the search destination pattern region is adjacent in the search direction to the search source pattern region, and newly sets the search destination pattern region as the search source pattern region to perform the positional relationship identification processing.

BRIEF DESCRIPTION OF THE DRAWINGS

FIG. 6 is a diagram illustrating center coordinates of extracted pattern regions as a list.

DESCRIPTION OF EXEMPLARY EMBODIMENTS

Embodiments of the present disclosure will be described below with reference to the accompanying drawings. Note that each of the drawings is merely illustrative for describing the embodiment. Since the drawings are illustrative, proportions and shapes may not be precise, match each other, or some may be omitted.

Figure 1:
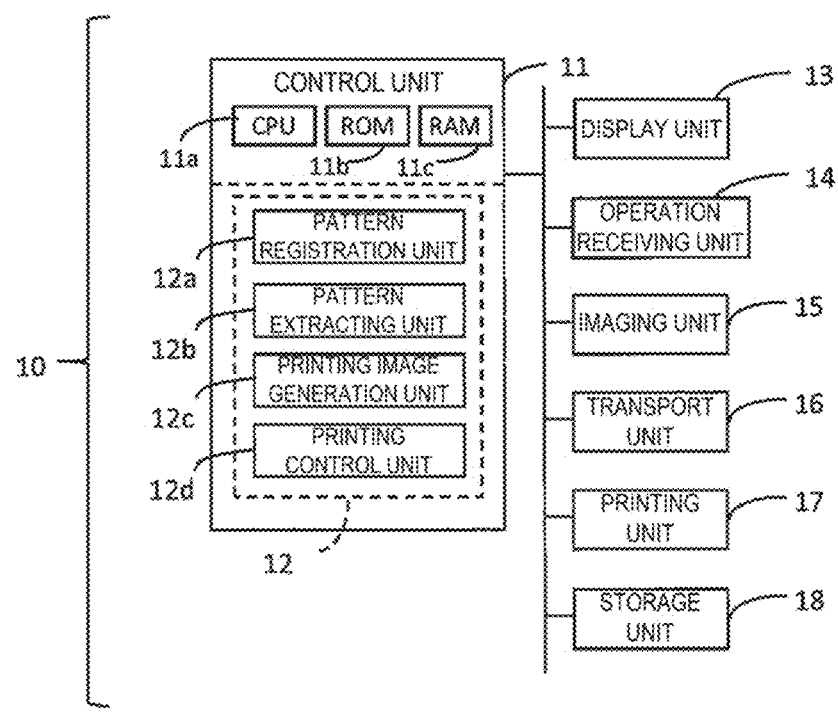
FIG. 1 is a block diagram illustrating a configuration of a printing apparatus in a simplified manner.

1. Apparatus Configuration:

FIG. 1 illustrates a configuration of a printing apparatus 10 according to the embodiment, in a simplified manner.

The printing apparatus 10 performs a printing method. The printing apparatus 10 is provided with a control unit 11, a display unit 13, an operation receiving unit 14, an imaging unit 15, a transport unit 16, a printing unit 17, a storage unit 18, and the like. The control unit 11 is configured to include, as a processor, one or more ICs including a CPU 11a, a ROM 11b, a RAM 11c, and the like, another non-volatile memory, and the like.

In the control unit 11, the processor, that is, the CPU 11a executes arithmetic processing in accordance with one or more programs 12 stored in the ROM 11b, the other memory, or the like, using the RAM 11c or the like as a work area, to control the printing apparatus 10. The control unit 11 functions, in accordance with the program 12, as a pattern registration unit 12a, a pattern extracting unit 12b, a printing image generation unit 12c, a printing control unit 12d, and the like. Note that the processor is not limited to the single CPU, and a configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a device for displaying visual information, and is configured, for example, by a liquid crystal display, an organic EL display, or the like. The display unit 13 may be configured to include a display and a drive circuit for driving the display. The operation receiving unit 14 is a device for receiving an operation by a user, and is realized, for example, by a physical button, a touch panel, a mouse, a keyboard, or the like. Of course, the touch panel may be realized as a function of the display unit 13. The display unit 13 and the operation receiving unit 14 may be part of the configuration of the printing apparatus 10, or may be peripheral devices externally coupled to the printing apparatus 10.

The transport unit 16 is a mechanism for transporting a printing medium under control by the control unit 11. In the present exemplary embodiment, a fabric is assumed, as the printing medium, formed with a stereoscopic pattern by devising a weaving method of yarns and fibers, such as a jacquard woven fabric or a lace fabric. In the fabric, a certain pattern or a set of certain patterns are formed so as to be aligned repeatedly. In the following, a pattern or a set of patterns will be treated as one pattern.

The transport unit 16 includes, for example, a feeding roller for feeding a fabric before printing, which is wound in a roll shape, to downstream of transport, a belt or roller for further transporting the fabric fed, a winding roller for winding the fabric after the printing in a roll shape and collecting the fabric, a motor for rotating each roller or belt, or the like. In the following, upstream, and downstream of a transport direction by the transport unit 16 are described simply as upstream, and downstream.

The imaging unit 15 images the fabric transported by the transport unit 16 under control by the control unit 11. The imaging unit 15 has a configuration such as a light source that irradiates the fabric, an imaging element that receives reflected light from the fabric, and generates and outputs image data as an imaging result, or the like.

The printing unit 17 performs printing on the fabric transported by the transport unit 16 under control by the control unit 11. The printing unit 17 is provided downstream from the imaging unit 15. The printing unit 17 performs printing on the fabric based on printing image data transmitted from the control unit 11. The printing unit 17 can perform printing by discharging ink of a plurality of colors such as cyan, magenta, yellow, and black, for example, by an ink-jet method. According to the ink-jet method, the printing unit 17 performs printing on the fabric by discharging dots of ink from a nozzle (not illustrated) based on printing image data defining dot on or dot off of each ink for each pixel.

The storage unit 18 is a storage method such as a non-volatile memory or a hard disk drive. The storage unit 18 may be interpreted as a part of the control unit 11. Additionally, the RAM 11c may be interpreted as a part of the storage unit 18.

The printing apparatus 10 may be referred to as a recording device, an image forming device, a printer, or the like. The printing apparatus 10 may be realized not only by a single independent device, but also by a plurality of devices communicatively coupled to each other via a communication interface or a network. The printing apparatus 10 configured by a plurality of devices may be referred to as a printing system 10.

The printing system 10 is configured to include, for example, a printer including the imaging unit 15, the transport unit 16, and the printing unit 17, and one or more information processing devices that function as the control unit 11. The information processing device is, for example, a personal computer (PC), a server, a smart phone, a tablet terminal, or a device having the same degree of processing capability as those devices. In the printing system 10, a device serving as the control unit 11 may be referred to as an image processing apparatus, a printing control device, or the like. Of course, some devices that configure the printing system 10 may be considered as an invention.

Figure 2A:
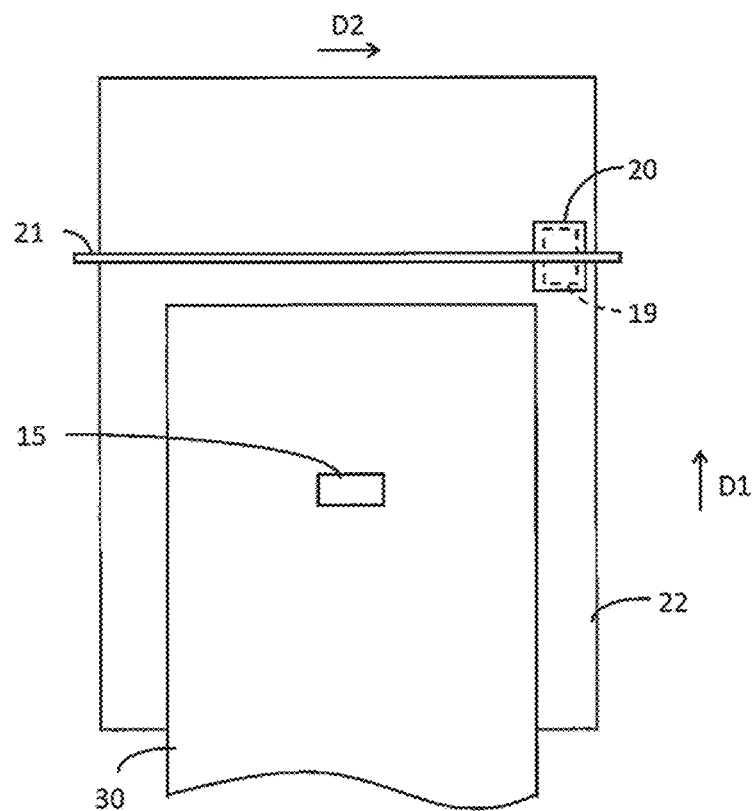
FIG. 2A is a view illustrating a configuration of a fabric to be transported and a vicinity thereof in a perspective facing downward from above.

FIG. 2A illustrates a configuration of a fabric 30 to be transported and a vicinity of the fabric 30 in a perspective facing downward from above. In FIG. 2A, a depiction of a pre-formed pattern in the fabric 30 is omitted. In FIG. 2A, a transport direction of the fabric 30 by the transport unit 16 is denoted by a reference sign D1. A reference sign 22 denotes an endless belt 22 as a portion of the transport unit 16. The fabric 30 in a state of being placed on the endless belt 22 is transported from upstream to downstream by the endless belt 22 rotating.

As illustrated in FIG. 2A, a carriage 20 is arranged above the endless belt 22. The carriage 20 can reciprocate along a direction D2 that intersects the transport direction D1. Although the intersection here is orthogonal, it may be understood that orthogonal includes not only strict orthogonality, but also errors that occur in product manufacturing. The carriage 20 moves along an elongated guide member 21 in the direction D2. The direction D2 is also referred to as a main scanning direction of the carriage 20 and a printing head 19. The direction D2 is also referred to as a width direction of the fabric 30.

The carriage 20 is equipped with the printing head 19. That is, the printing head 19 reciprocates along the width direction D2 with the carriage 20. Such a carriage 20 and a printing head 19 configure the printing unit 17. Although not illustrated, a plurality of nozzles open on a lower surface opposite the endless belt 22 in the printing head 19. The printing head 19 discharges ink from the nozzle based on printing image data while moving along the width direction D2 with the carriage 20.

As illustrated in FIG. 2A, the imaging unit 15 is arranged above the endless belt 22 at a predetermined position upstream of the carriage 20 and the printing head 19.

Figure 2B:
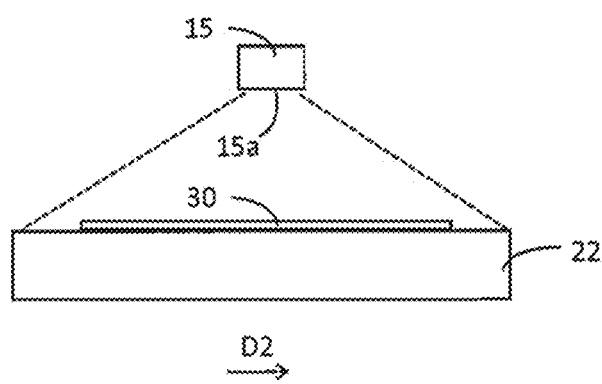
FIG. 2B is a view illustrating a part of the configuration illustrated in FIG. 2A in a perspective facing downstream from upstream.

FIG. 2B illustrates a part of the configuration illustrated in FIG. 2A in a perspective facing downstream from upstream. The imaging unit 15 has a lower surface opposite the endless belt 22 as an imaging surface 15a, and images the fabric 30 above the endless belt 22 via the imaging surface 15a. The imaging unit 15 is, for example, a line scan type camera in which a plurality of imaging elements are arranged inside thereof in the width direction D2. The imaging unit 15 repeats imaging on a line-by-line basis via a lens (not illustrated) and the imaging element provided at the imaging surface 15a. In FIG. 2B, an imaging range in the width direction D2 by the imaging unit 15 is illustrated by dashed lines. The imaging unit 15 is capable of imaging approximately an entire range of the endless belt 22 in the width direction D2 by a function of the lens.

The configuration of the imaging unit 15 is not limited to the example of FIGS. 2A and 2B. For example, a configuration may be adopted in which a plurality of the imaging units 15 are arranged above the endless belt 22 along the width direction D2, and each of the plurality of imaging units 15 takes charge of a partial range of the entire range of the endless belt 22 in the width direction D2 and performs imaging. Alternatively, the imaging unit 15 may be a line sensor configured by arranging the plurality of imaging elements over approximately the entire range of the endless belt 22 in the width direction D2. Alternatively, similar to the printing head 19 mounted on the carriage 20, the imaging unit 15 may be configured to be mounted on a carriage that can move along the width direction D2, and to image above the endless belt 22 while moving in the width direction D2 by the carriage.

Figure 3:
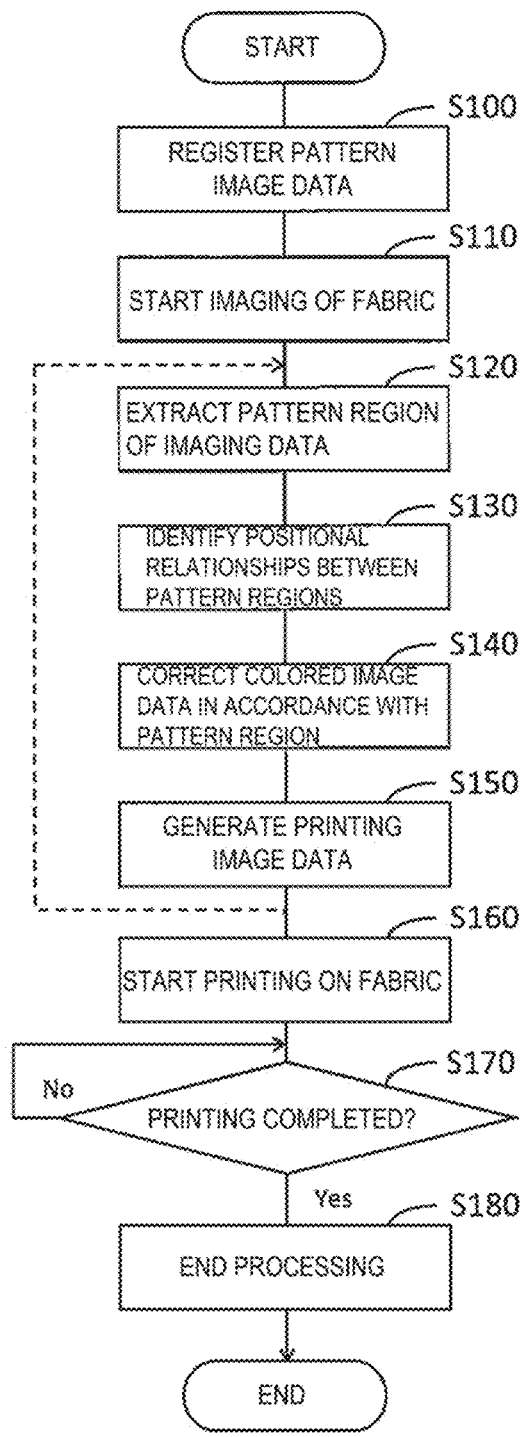
FIG. 3 is a flowchart illustrating printing processing.

2. Printing Method:

FIG. 3 illustrates, by a flowchart, printing processing that the control unit 11 performs in accordance with the program 12.

In step S100, the pattern registration unit 12a of the control unit 11 registers pattern image data representing a pattern formed in the fabric 30 with the storage unit 18. The pattern image data corresponds to "first image data", and step S100 corresponds to a registration step.

Figure 4:
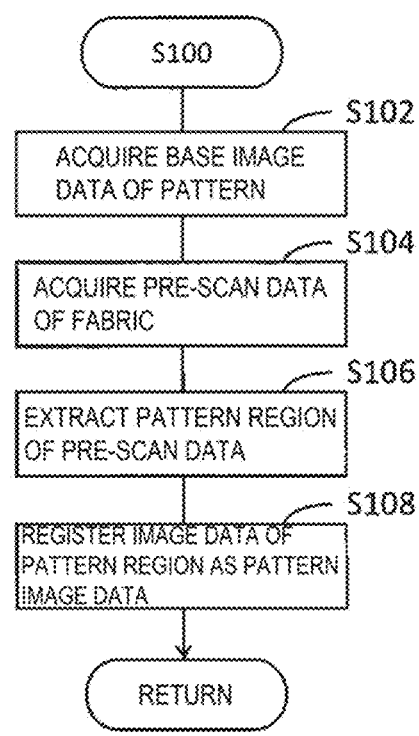
FIG. 4 is a flowchart illustrating details of step S100.

FIG. 4 illustrates details of step S100 by a flowchart.

In step S102, the pattern registration unit 12a acquires base image data representing the pattern in the fabric 30. The fabric 30 is a woven fabric in which, for example, one pattern designed by a designer is woven repeatedly. Therefore, it is assumed that the base image data is image data representing the one pattern that is generated in advance using predetermined software for design or drawing. The pattern registration unit 12a is input with base image data stored in a PC from the PC external to the printing apparatus 10, for example, in accordance with a user operation, and stores the input base image data in the storage unit 18.

In step S104, the pattern registration unit 12a acquires pre-scan data, which is image data generated by pre-scan of the fabric 30. The pre-scan means reading or imaging that is performed before imaging of the fabric 30 to be started in step S110 described below. For example, a user causes a scanner external to the printing apparatus 10 to scan the fabric 30 in advance. Then, the pattern registration unit 12a is input with image data generated by this scan from the scanner, and stores the image data as pre-scan data in the storage unit 18.

Alternatively, the pre-scan may be performed by the imaging unit 15. For example, the control unit 11 causes the transport unit 16 to start transporting the fabric 30, and causes the transport of the fabric 30 to stop at timing at which a tip of the fabric 30 reaches a position, which is downstream from the imaging unit 15 by a predetermined distance. The tip of the fabric 30 is an end portion facing downstream of the fabric 30. The imaging unit 15 images the fabric 30 passing by transporting under the imaging unit 15, and the pattern registration unit 12a is input with image data generated by this imaging from the imaging unit 15 and stores the image data as pre-scan data in the storage unit 18.

In step S106, the pattern registration unit 12a compares the base image data acquired in step S102 with the pre-scan data acquired in step S104 to extract, in the pre-scan data, a pattern region corresponding to one pattern of the fabric 30. At this time, the pattern registration unit 12a uses an image recognition technology to extract an image region with higher similarity with the base image data in the pre-scan data, and uses this image region as the pattern region.

Then, in step S108, the pattern registration unit 12a stores image data corresponding to the pattern region extracted in step S106 in the storage unit 18 as pattern image data. With the above, the registration of the pattern image data is completed.

According to the description according to FIG. 4, the pattern image data can be said to be at least a part of the pre-scan data.

However, the pattern registration unit 12a may simplify step S100 by registering base image data itself with the storage unit 18 as pattern image data.

Returning to the description of FIG. 3.

In step S110, the control unit 11 causes the imaging unit 15 to start imaging with the fabric 30 as a target that the transport unit 16 transports at predetermined velocity. That is, in step S110, a "transport step" of the fabric 30 is started. In addition, an "imaging step" is started by step S110. Image data on a line-by-line basis generated by the imaging of the fabric 30 by the imaging unit 15 is sequentially output to the control unit 11. The control unit 11 acquires two-dimensional imaging data, by sequentially storing the image data on a line-by-line basis from the imaging unit 15. The imaging data corresponds to "second image data".

In step S120, the pattern extracting unit 12b, based on a comparison between the pattern image data registered in step S100 and the imaging data generated by the imaging in step S110, extracts a pattern region corresponding to the pattern in the fabric 30 in the imaging data. In the imaging data, a plurality of the patterns are represented side by side. Therefore, the pattern extracting unit 12b extracts a pattern region for each of the patterns that are represented side by side in the imaging data. Step S120 corresponds to a "pattern extraction step".

It is sufficient that the pattern extracting unit 12b uses an image recognition technology to extract, as a pattern region, an image region having a degree of similarity with the pattern image data that is higher than a predetermined level. Specifically, the pattern extracting unit 12b extracts an edge of an image in the pattern image data, and similarly extracts an edge of an image in the imaging data. Then, an edge distribution in the pattern image data is repeatedly compared with an edge distribution in the imaging data, while a position is shifted, and while the pattern image data is deformed, and a region in which a degree of match between the edge distributions is highly evaluated above a predetermined level is extracted as one pattern region. Note that, as in the processing in step S120, in step S106 described above, the pattern registration unit 12a can extract a pattern region in pre-scan data according to a degree of match of edge distributions between images to be compared.

In the present exemplary embodiment, an orientation of each image data, such as pattern image data, imaging data, and printing image data handled by the control unit 11 will also be described corresponding to the transport direction D1 and the width direction D2. Here, when the width direction D2 is taken as an X-axis, and the transport direction D1 is taken as a Y-axis, coordinates of imaging data are defined in a two-dimensional plane according to the orthogonal X- and Y-axes. Accordingly, the processing of extracting a pattern region from imaging data is processing of identifying coordinates of the pattern region in the imaging data. More specifically, the pattern extracting unit 12b acquires center coordinates of a region in imaging data that can be evaluated as one pattern region in accordance with the degree of match of edge distributions as described above as an extraction result of one pattern region. With such processing, the pattern extracting unit 12b extracts a plurality of the pattern regions from the imaging data.

In step S130, the pattern extracting unit 12b identifies positional relationships of the plurality of pattern regions extracted in step S120. Step S130 may also be understood as a part of the pattern extraction step.

Figure 5:
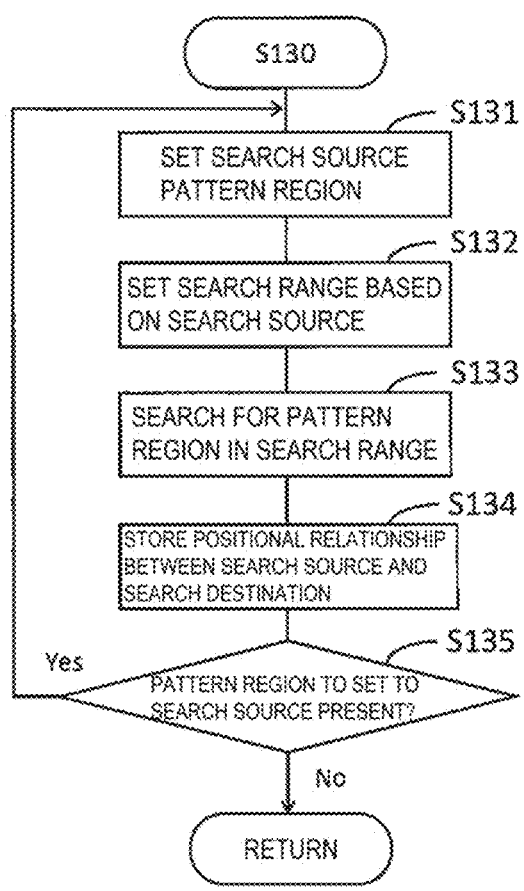
FIG. 5 is a flowchart illustrating details of step S130.

FIG. 5 illustrates details of step S130 by a flowchart.

In step S131, the pattern extracting unit 12b sets at least one of the plurality of pattern regions extracted in step S120 to a "search source pattern region".

FIG. 6 illustrates center coordinates of the pattern regions extracted in step S120 as a list. FIG. 6 illustrates a correspondence relationship between a pattern region name and center coordinates (X, Y) of the pattern region for each pattern region. For example, center coordinates of a pattern regions A1 are (x1, y1). Information obtained as an extraction result of the pattern region by step S120 is information of the center coordinates (X, Y) of each pattern region. In FIG. 6, for convenience of explanation, the pattern region name is described for each pattern region. Of course, the pattern extracting unit 12b can assign a pattern region name to the center coordinates (X, Y) of each pattern region obtained in step S120 for distinguishing the center coordinates.

In the first step S131 in step S130, the pattern extracting unit 12b sets a pattern region in which, for example, both X and Y coordinates are smallest among the pattern regions illustrated in FIG. 6, to a search source. Here, as an example, it is assumed that the pattern region A1 is set to a search source.

In step S132, the pattern extracting unit 12b sets a search range based on a search source pattern region. Specifically, the pattern extracting unit 12b sets, as a search range, a certain range from the search source pattern region to a position separated in a predetermined search direction by a predetermined distance. The predetermined distance referred to herein refers to a predetermined distance suitable for searching for other pattern regions adjacent to the search source.

In step S133, the pattern extracting unit 12b searches the search range for a pattern region. In this case, when center coordinates of a pattern region can be found from within the search range, the search is successful. The pattern region successfully found in step S133 is referred to as "a search destination pattern region".

In step S134, the pattern extracting unit 12b stores a positional relationship between the search source pattern region and the search destination pattern region. In this case, the pattern extracting unit 12b stores information that a position of the search destination pattern region is adjacent to the search source pattern region in the search direction. Steps S131 to S134 correspond to positional relationship identification processing.

In step S135, the pattern extracting unit 12b determines whether a pattern region to be set to a search source is remaining or not, and determines "Yes" to proceeds to step S131 when there is a pattern region to be set to a search source. For example, it is sufficient that the pattern extracting unit 12b determines "No", that is, determines that a pattern region to be set to a search source is not left, when for all of the pattern regions extracted in step S120, the pattern region has been at least set to a search source pattern region, or a positional relationship between the pattern region and the search source pattern region has been stored, and ends step S130. It is sufficient that, when the search in step S133 has not been successful, the pattern extracting unit 12b substantially skips step S134, and proceeds to the determination in step S135.

In step 131 after "Yes" in step S135, the pattern extracting unit 12b newly sets a pattern region, which has not yet been set to a search source, among the pattern regions extracted in step S120 to a search source pattern region, and repeats the positional relationship identification processing. At this time, it is sufficient that the pattern extracting unit 12b newly sets the search destination pattern region to a search source pattern region, and repeats the positional relationship identification processing.

Figure 7:
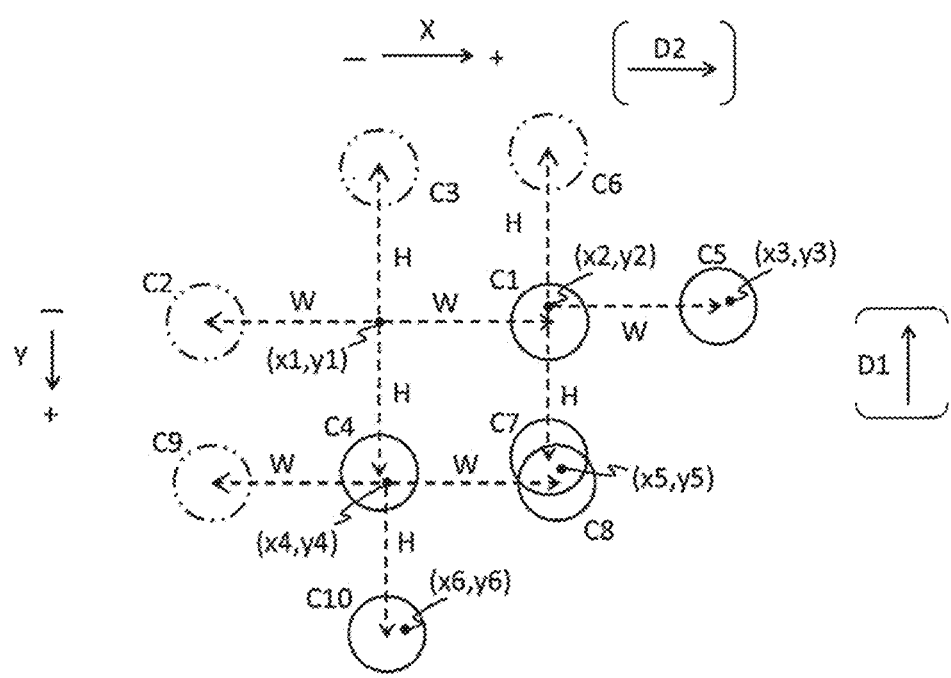
FIG. 7 is a diagram for explaining step S130 by a specific example.

FIG. 7 is a diagram for explaining step S130 by a specific example. FIG. 7 illustrates center coordinates of some of pattern regions in a two-dimensional plane according to orthogonal X- and Y-axes, and the like. In the figure, it may be interpreted that an X-axis + direction corresponds to the width direction D2, and an X-axis − direction corresponds to a reverse direction of the width direction D2. Furthermore, a Y-axis + direction corresponds to an upstream direction in the transport direction D1, and a Y-axis − direction corresponds to a downstream direction in the transport direction D1.

In the first step S131 in step S130, the pattern extracting unit 12b sets the pattern region A1 to a search source, for example. In FIG. 7, the center coordinates (x1, y1) of the pattern region A1 are illustrated. The pattern extracting unit 12b that has set the pattern region A1 to the search source sets, in step S132, a circle C1 centered at a position separated in the X-axis + direction from the center coordinates (x1, y1) by a predetermined distance W, and sets a circle C2 centered at a position separated in the X-axis − direction from the center coordinates (x1, y1) by the distance W. In addition, the pattern extracting unit 12b sets a circle C3 centered at a position separated in the Y-axis − direction from the center coordinates (x1, y1) by a predetermined distance H, and sets a circle C4 centered at a position separated in the Y-axis + direction from the center coordinates (x1, y1) by the distance H.

In other words, a direction parallel to the X-axis and a direction parallel to the Y-axis each correspond to a predetermined search direction. In addition, such a search direction can be referred to as a lateral direction or a vertical direction of imaging data. A direction parallel to the width direction D2 may be interpreted as the lateral direction, and a direction parallel to the transport direction D1 may be interpreted as the vertical direction. The distance H and the distance W are ideal vertical and lateral lengths of a pattern region, respectively, and are predetermined values in the present exemplary embodiment. Alternatively, the pattern extracting unit 12b may treat a vertical length of pattern image data as the distance H, and a lateral length of the pattern image data as the distance W.

The circles C1, C2, C3, and C4 set in this manner are each a search range based on the pattern region A1 of the search source. A diameter of the circle as the search range is also predetermined, and is a suitable value for searching for other pattern regions adjacent to the search source. In step S133, the pattern extracting unit 12b searches for center coordinates of a pattern region in each of the circles C1, C2, C3, and C4, and sets a pattern region containing the center coordinates in the circle to a search destination pattern region. According to FIG. 7, the center coordinates (x2, y2) of the pattern region A2 are contained in the circle C1, and the central coordinates (x4, y4) of the pattern region A4 are contained in the circle C4. Therefore, searching for the pattern regions A2 is successful when the circle C1 is a search range, and searching for the pattern regions A4 is successful when the circle C4 is a search range. In FIG. 7, among the circles set as the search ranges, a circle containing center coordinates of a pattern region therein is indicated by a solid line, and a circle that does not contain central coordinates of a pattern region therein is indicated by a two dot chain line.

In step S134, the pattern extracting unit 12b stores positional relationship information that the pattern region A2 of a search destination is adjacent to the pattern region A1 of the search source in the X-axis + direction, and the pattern region A4 of a search destination is adjacent to the pattern region A1 of the search source in the Y-axis + direction. After this step S134, the pattern extracting unit 12b newly sets each of the pattern regions A2 and A4 to a search source in step S131 after the determination of "Yes" in step S135.

Accordingly, in step S132, the pattern extracting unit 12b sets a circle C5 centered at a position separated in the X-axis + direction from the center coordinates (x2, y2) of the pattern region A2 by the distance W, and sets a circle C6 centered at a position separated in the Y-axis − direction from the center coordinates (x2, y2) by the distance H, and sets a circle C7 centered at a position separated in the Y-axis + direction from the center coordinates (x2, y2) by the distance H. Similarly, the pattern extracting unit 12b sets a circle C8 centered at a position separated in the X-axis + direction from the center coordinates (x4, y4) of the pattern region A4 by the distance W, sets a circle C9 centered at a position separated in the X-axis − direction from the center coordinates (x4, y4) by the distance W, and sets a circle C10 centered at a position separated in the Y-axis + direction from the center coordinates (x4, y4) by the distance H. Note that, the pattern extracting unit 12b need not set a circle as a search range in a direction in which an adjacent relationship with the other pattern regions has already been found, in four directions of the X-axis + and − directions and the Y-axis + and − directions based on the search source pattern region.

In step S133, the pattern extracting unit 12b searches for center coordinates of a pattern region in each of the circles C5, C6, C7, C8, C9, and C10, and sets a pattern region containing the center coordinates in the circle to a search destination pattern region. According to FIG. 7, the center coordinates (x3, y3) of the pattern region A3 are contained in the circle C5, and the center coordinates (x5, y5) of the pattern region A5 are contained in the circle C7. Also, the central coordinates (x5, y5) of the pattern region A5 are contained in the circle C8, and the center coordinates (x6, y6) of the pattern region A6 are contained in the circle C10.

Accordingly, in step S134, the pattern extracting unit 12b stores positional relationship information that the pattern region A3 of a search destination is adjacent to the pattern region A2 of the search source in the X-axis + direction, and the pattern region A5 of a search destination is adjacent to the pattern region A2 of the search source in the Y-axis + direction. Similarly, the pattern extracting unit 12b stores positional relationship information that the pattern region A5 of a search destination is adjacent to the pattern region A4 of the search source in the X-axis + direction, and the pattern region A6 of a search destination is adjacent to the pattern region A4 of the search source in the Y-axis + direction. After this step S134, the pattern extracting unit 12b sets each of the pattern regions A3, A5, and A6 to a search source in step S131 after the determination of "Yes" in step S135. Hereinafter, similar processing is repeated.

In this manner, the pattern extracting unit 12b repeats the positional relationship identification processing, by generating a search chain in which the search destination pattern region where the coordinates are found from the search range is newly set as a search source. As a result, the pattern extracting unit 12b can accurately identify a positional relationship between pattern regions, such as which pattern region and which pattern region are adjacent in which direction, for the plurality of pattern regions extracted in step S120.

Returning to the description of FIG. 3.

In step S140, the printing image generation unit 12c corrects colored image data that represents an image to be printed overlaid on the pattern in the fabric 30 such that the colored image data matches a shape of the pattern region. The colored image data corresponds to "third image data". The colored image data is pre-generated color image data representing a color to color one pattern, or a print range of a color. The colored image data is stored in advance in the storage unit 18, for example. Alternatively, the control unit 11 is input with colored image data stored in a PC from the PC external to the printing apparatus 10, for example, in accordance with a user operation, and stores the input colored image data in the storage unit 18.

In the imaging data, the center coordinates of the respective pattern regions are ideally present at constant intervals along each of the transport direction D1 and the width direction D2. In addition, the pattern region is ideally a rectangle in which a vertical length is H, and a lateral length is W. However, as described above, distortion and the like may be generated in the fabric 30 being transported, thus positional relationships of the center coordinates of the plurality of pattern regions extracted from the imaging data in step S120 may also be arranged in an affected manner such as such distortion and the like. For example, a center of the pattern region A2 adjacent in the X-axis + direction to the pattern region A1 is assumed to ideally coincide with a center of the circle C1, but according to the example of FIG. 7, the center coordinates (x2, y2) of the pattern region A2 are shifted from the center of the C1. Further, a center of the pattern region A4 adjacent in the X-axis + direction to the pattern region A1 is assumed to ideally coincide with a center of the circle C4, but according to the example of FIG. 7, the center coordinates (x4, y4) of the pattern region A4 are shifted from the center of the C4.

Therefore, in performing step S140, the pattern extracting unit 12b or the printing image generation unit 12c identifies a shape of each pattern region in the imaging data, based on the center coordinates of the pattern region extracted in step S120, and the positional relationship between the pattern regions identified in step S130. In this case, it is sufficient that the pattern extracting unit 12b identifies a shape of each pattern region, by repeating processing of calculating coordinates of four corners of a quadrangle centered or substantially centered at one set of center coordinates in accordance with a distance from center coordinates of the adjacent surrounding pattern regions and a positional relationship. Each pattern region identified in this manner may have a shape that is distorted, expanded, and contracted due to distortion and the like of the fabric 30.

The printing image generation unit 12c deforms a shape of the colored image data such that the shape matches individual shape of the pattern region. As a deformation method, for example, an affine transformation including expansion, contraction, rotation, shear, and the like of an image, or another deformation method is used. Such deformation is a correction by step S140. Depending on the shape of the pattern region, the correction in step S140 is unnecessary in some cases as a result.

In step S150, the printing image generation unit 12c arranges a plurality of pieces of the colored image data after step S140 so as to correspond to the positional relationships of the plurality of pattern regions in the imaging data to generate printing image data. The printing image data is image data in which the plurality of pieces of colored image data after step S140 are combined, and is an image printed on a region of the fabric 30 as a target of imaging. Such steps S140 and S150 correspond to a "printing image generation step" for arranging third image data in accordance with the positional relationship between the pattern regions to generate printing image data.

Figure 8:
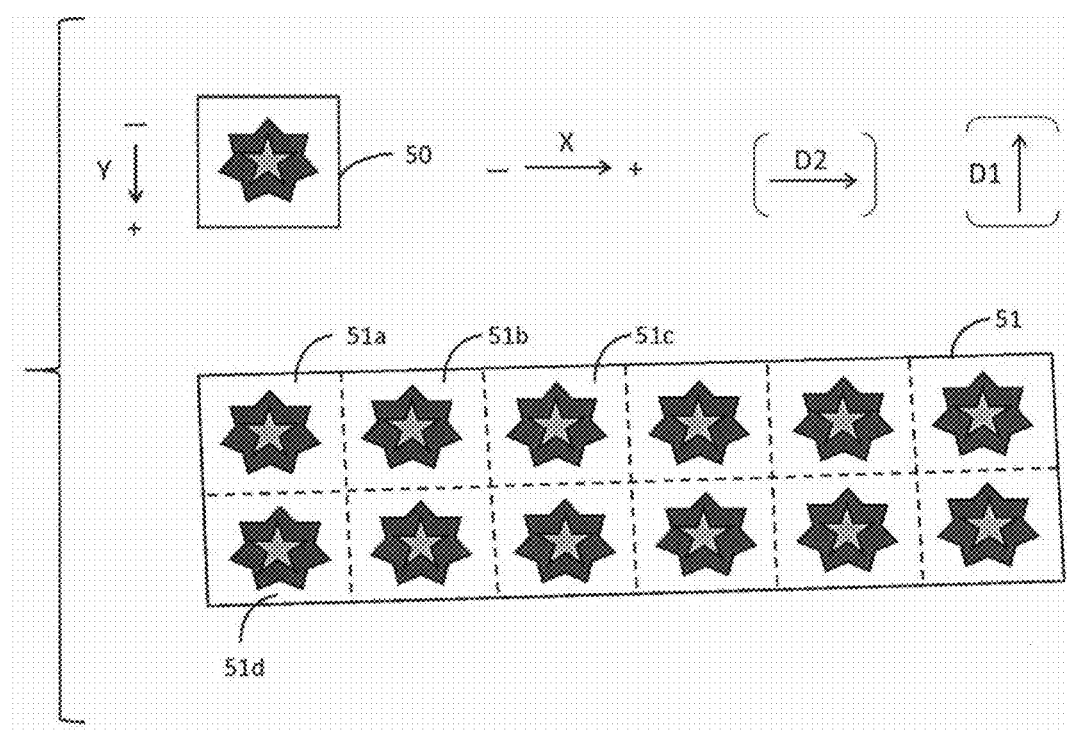
FIG. 8 is a diagram for explaining steps S140 and S150 by a specific example.

A specific example of steps S140 and S150 will be described with reference to FIG. 8. A reference sign 50 denotes colored image data 50. In the example in FIG. 8, the colored image data 50 is color image data representing colors to be colored overlaid on a pattern designed with a petal as a motif. The colored image data 50 may be interpreted as an image having the same or substantially the same size as the pattern image data vertically and laterally. A reference sign 51a denotes colored image data 51a after the colored image data 50 is corrected in accordance with a shape of the pattern region A1 having the center coordinates (x1, y1). Similarly, a reference sign 51b denotes colored image data 51b after the colored image data 50 is corrected in accordance with a shape of the pattern region A2 adjacent in the X-axis + direction to the pattern region A1. In FIG. 8, boundaries of pieces of the colored image data after the correction are partially indicated by broken lines.

A reference sign 51c denotes colored image data 51c after the colored image data 50 is corrected in accordance with a shape of the pattern region A3 adjacent in the X-axis + direction to the pattern region A2. A reference sign 51d denotes colored image data 51d after the colored image data 50 is corrected in accordance with a shape of the pattern region A4 adjacent in the Y-axis + direction to the pattern region A1. Then, such pieces of colored image data 51a, 51b, 51c, 51d and the like combined in accordance with the positional relationships of the pattern regions in the imaging data form printing image data 51.

As indicated by a dashed arrow in FIG. 3, the control unit 11, after starting imaging of the fabric 30 in step S110, repeats steps S120 to S150 in accordance with the imaging data obtained sequentially from the imaging unit 15. In other words, the control unit 11 performs steps S120 and S130 using imaging data of a predetermined size obtained sequentially from the imaging unit 15 as a target, and performs steps S140 and S150 in response to a result of steps 120 and S130. The printing image data 51 illustrated in FIG. 8 is the printing image data obtained as a result of one cycle of such steps S120 to S150.

In step S160, the printing control unit 12d starts printing of the printing image data generated in step S150 on the fabric 30. In other words, a "printing step" is started by step S160. The printing image generation unit 12c sequentially generates printing image data by repeating steps S140 and S150, and outputs the printing image data sequentially to the printing control unit 12d in an order of generation. The printing control unit 12d appropriately performs various types of necessary processing such as so-called color conversion processing and halftone processing on the printing image data acquired from the printing image generation unit 12c, to convert the printing image data into printing image data in a format used by the printing unit 17 for printing. The printing control unit 12d may temporarily accumulate the printing image data after such conversion in a buffer.

Then, the printing control unit 12d transfers the printing image data after the above conversion to the printing unit 17, and causes the printing unit 17 to start printing by movement of the carriage 20 and ink discharge from the printing head 19 based on the printing image data at predetermined timing at which a position of the fabric 30 for which imaging is started by step S110 reaches below the printing head 19. As a result, color images represented by the individual colored image data constituting the printing image data are printed overlaid on the pattern in a shape that matches the individual pattern in the fabric 30.

The transport unit 16 is provided with an encoder that detects an amount of rotation of rollers and belts rotating for transport. The printing control unit 12d computes a transport distance of the fabric 30 in accordance with a detection signal from the encoder. Accordingly, the printing control unit 12d can grasp a current position in the transport direction D1 of the fabric 30 for which imaging is started by step S110, and can cause the printing unit 17 to start printing on the fabric 30 at timing at which the position reaches below the printing head 19.

After printing is started in step S160, the control unit 11 determines whether to end the printing or not (step S170). When ending the printing, the control unit 11 determines "Yes" and proceeds to end processing in step S180. The control unit 11 determines to end the printing when, for example, the end of printing is instructed by a user, or when the transport of the fabric 30 by a predetermined length is completed.

In the end processing in step S180, the control unit 11 stops imaging of the fabric 30 by the imaging unit 15. In addition, the control unit 11 stops driving the transport unit 16 and the printing unit 17 after causing the printing unit 17 to perform printing based on the printing image data generated in one cycle of the last steps S120 to S150, and ends the flowchart in FIG. 3. Of course, the control unit 11 may stop the transport unit 16 after controlling necessary processing such as collection of the fabric 30 by a winding roller.

3. N Times Search:

Additional description will be given with respect to the positional relationship identification processing. The pattern extracting unit 12b may search for a pattern region at a position separated to a certain extent from a search source pattern region, in addition to searching for a pattern region adjacent to a search source pattern region as described above, in the positional relationship identification processing. In other words, in steps S131 to S133, the pattern extracting unit 12b sets a pattern region successfully found in a certain range that is set at a position a predetermined distance×N away in a search direction from a search source pattern region, to an "N times search destination pattern region". Then, in step S134, it is stored that a position of the N times search destination pattern region is N pattern regions ahead of the search source pattern region in the search direction. N is an integer of 2 or greater. Here, N=2. Incidentally, being present one ahead from a search source pattern region means being adjacent to a search source pattern region.

Description will be made again with reference to FIG. 7. It is assumed that the pattern extracting unit 12b has set the pattern region A1 having the center coordinates (x1, y1) to a search source in step S131. In this case, the pattern extracting unit 12b sets, in step S132, as search ranges based on the center coordinates (x1, y1), in addition to the circles C1, C2, C3, and C4 illustrated in FIG. 7, a circle centered at a position separated in the X-axis + direction from the center coordinates (x1, y1) by a distance W×2, a circle centered at a position separated in the X-axis − direction from the center coordinates (x1, y1) by the distance W×2, a circle centered at a position separated in the Y-axis − direction from the center coordinates (x1, y1) by a distance H×2, and a circle centered at a position separated in the Y-axis + direction from the center coordinates (x1, y1) by the distance H×2. Then, in step S133, the pattern extracting unit 12b searches for center coordinates of a pattern region in each of the eight circles.

Depending on extraction accuracy of a pattern region by step S120, a part of a pattern region actually represented in imaging data may not be extracted. In step S120, it is assumed that the center coordinates (x2, y2) of the pattern region A2 have not been extracted. When the center coordinates (x2, y2) have not been extracted, the pattern extracting unit 12b cannot find center coordinates of a pattern region from the circle C1, which is set based on the center coordinates (x1, y1) of the pattern region A1. As a result, a search chain assuming that a plurality of pattern regions are continuous and adjacent to each other in the search direction is interrupted, and searching cannot be performed about the pattern regions A3, and the like, that are present farther in the X-axis + direction than the pattern region A1.

With respect to such a disadvantage, by performing a search in a certain range at a position a predetermined distance×N away in the search direction from the search source pattern region as described above, even if the adjacent pattern region A2 cannot be searched for with the pattern region A1 as the search source, the pattern regions A3 having the center coordinates (x3, y3) present two ahead from the pattern region A1 in the X-axis + direction can be searched for.

Note that, considering effects of distortion and the like in the fabric 30, the farther away a search range is from a search source that is set based on a search source pattern region, the more a pattern region N ahead from the search source pattern region in a search direction cannot be correctly searched. Therefore, approximately 2 or 3 is appropriate for N.

In addition, according to the positional relationship identification processing, even when the center coordinates (x2, y2) of the pattern region A2 have not been extracted in step S120 as described above, the search chain goes around without passing through the pattern region A2, and thus, searching can be performed about the pattern region A3 that is present farther in the X-axis + direction than the pattern region A1.

Specifically, the pattern region A4 having the center coordinates (x4, y4) adjacent in the Y-axis + direction is searched for with the pattern region A1 having center coordinates (x1, y1) as a search source. In addition, chained to this, the pattern region A5 having the center coordinates (x5, y5) adjacent in the X-axis + direction is searched for with the pattern region A4 as a search source, and further, a pattern region (not illustrated in FIG. 7) adjacent in the X-axis + direction is searched for with the pattern region A5 as a search source, and further, the pattern region A3 having the center coordinates (x3, y3) adjacent in the Y-axis − direction is searched for with this pattern region (not illustrated) as a search source.

4. Search Range Size Determination Method:

Although a diameter of a circle set as a search range in step S132 has been described as a predetermined value, a method for determining a size of a search range may be, for example, as follows.

Figure 9:
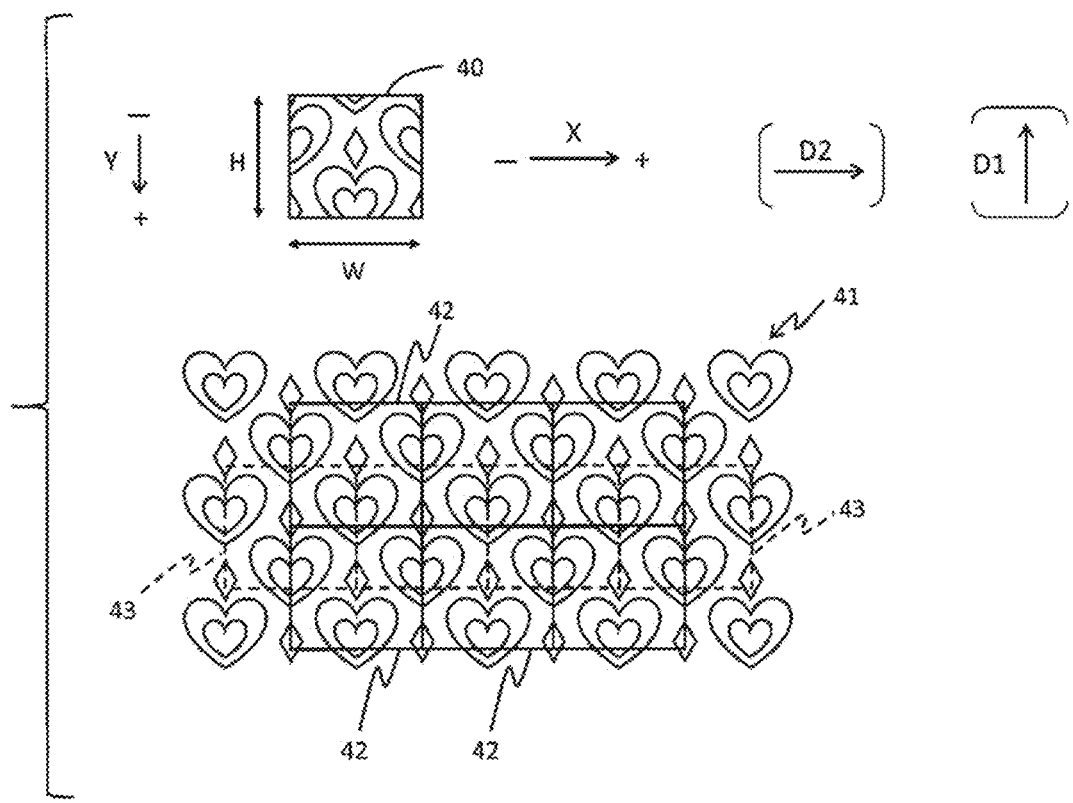
FIG. 9 is a diagram illustrating pattern image data and a part of imaging data.

FIG. 9 illustrates the pattern image data 40 registered in step S100, and a part of the imaging data 41 generated by the imaging in step S110. Additionally, FIG. 9 specifically illustrates a pattern constituted by heart shapes and the like in image data. In step S120, the pattern extracting unit 12b extracts a pattern region from the imaging data 41 based on a comparison between the pattern image data 40 and the imaging data 41.

In FIG. 9, each solid line frame denoted by a reference sign 42 in the imaging data 41 is a pattern region 42. Also, each dashed line frame denoted by a reference sign 43 in FIG. 9 is a pattern region 43. The pattern regions 42 and 43 each have a pattern similar to that of the pattern image data 40. As can be seen from the previous description, in step S120, the pattern extracting unit 12b extracts center coordinates of each of the pattern regions 42 and 43 in the imaging data 41.

Focusing on each solid line frame in the imaging data 41, the pattern regions 42 do not overlap with each other and are continuous at a fixed cycle in the imaging data 41. Further, focusing on each dashed line frame in the imaging data 41, the pattern regions 43 do not overlap with each other and are continuous at a fixed cycle in the imaging data 41. Then, the pattern region 42 and the pattern region 43 are shifted from each other by a distance, which is ½ of the cycle of the pattern regions, in each of the transport direction D1 and the width direction D2. As such, a design with which a similar pattern region can be extracted from each position that is shifted by a distance, which is ½ of an occurrence cycle of certain pattern regions, is adopted in various fabrics 30.

In the present exemplary embodiment, as in the case of the pattern region 42 and the pattern region 43, a relationship where parts of the pattern regions mutually overlap and the pattern regions are shifted from each other by the distance, which is ½ of the cycle of the pattern regions, in each of the transport direction D1 and the width direction D2 is referred to as a "½ phase shift" relationship. The pattern regions 42 are continuous without overlapping, and are in an identical phase relationship. The pattern regions 43 are also continuous without overlapping, and in the identical phase relationship. Then, a region covered by a linkage of a plurality of the pattern regions 42 is also covered by a linkage of a plurality of the pattern regions 43. Accordingly, considering that the printing image generation unit 12c arranges the colored image data so as to correspond to the positional relationship between the pattern regions to generate a linked piece of the printing image data in steps S140 and S150, it is sufficient for the printing image generation unit 12c to have information about either one of the pattern region 42 and the pattern region 43 having the ½ phase shift relationship. Therefore, the pattern extracting unit 12b can search for a pattern region in an identical phase based on a search source pattern region, and sets a search range of a size with which a pattern region in a different phase cannot be searched for.

Figure 10A:
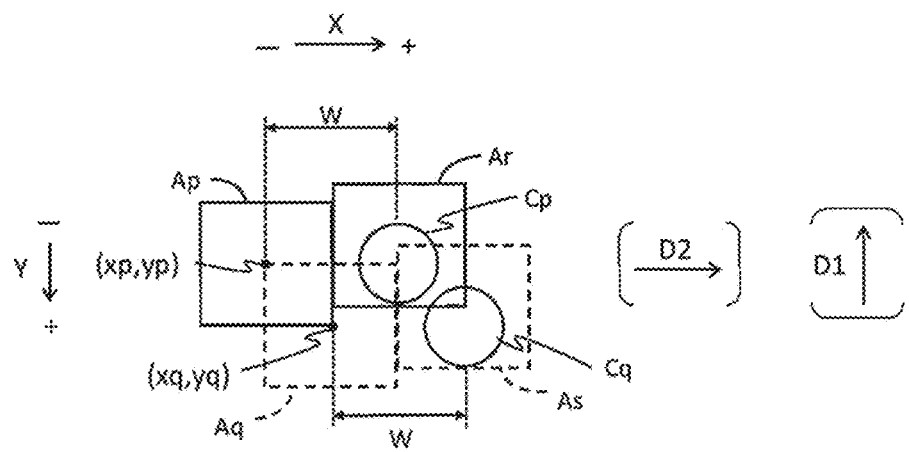
FIG. 10A is a diagram illustrating pattern regions having a ½ phase shift relationship.

FIG. 10A illustrates, similar to FIG. 9, several pattern regions having the ½ phase shift relationship in imaging data are indicated by solid lines and dashed lines. In FIG. 10A, a pattern illustrated in FIG. 9 is omitted in view of ease of visibility. Reference signs Ap and Ar denote two respective pattern regions Ap and Ar that are in an identical phase, and are adjacent to each other in the X-axis + direction. The pattern regions Ap and Ar may be understood as an example of the pattern regions 42 illustrated in FIG. 9. On the other hand, reference signs Aq and As denote two respective pattern regions Aq and As that are in an identical phase, and are adjacent to each other in the X-axis + direction. The pattern regions Aq and As may be understood as an example of the pattern regions 43 illustrated in FIG. 9. That is, the pattern regions Ap and Ar, and the pattern regions Aq and As have the ½ phase shift relationship.

In FIG. 10A, each of the pattern regions Ap, Aq, Ar, and As is illustrated simply as a rectangle, but a shape of an actual pattern region may be distorted, expanded, and contracted due to distortion and the like of the fabric 30 as described above. In step S120, center coordinates (X, Y) of each of the pattern regions Ap, Aq, Ar, and As are obtained as an extraction result of a pattern region.

When the pattern region Ap is set to a search source in step S131, the pattern extracting unit 12b sets, in step S132, a circle Cp centered at a position separated in the X-axis + direction from center coordinates (xp, yp) of the pattern region Ap by the distance W, to one of search ranges. The circle Cp is, of course, the search range for searching for center coordinates of the pattern region Ar adjacent in the X-axis + direction to the pattern region Ap. Also, center coordinates of the pattern region As having the ½ phase shift relationship is not to be searched for based on the circle Cp. Similarly, when the pattern region Ap is set to a search source in step S131, the pattern extracting unit 12b sets, in step S132, a circle Cq centered at a position separated in the X-axis + direction from center coordinates (xq, yq) of the pattern region Aq by the distance W, to one of the search ranges. The circle Cq is a search range for searching for the center coordinates of the pattern region As adjacent in the X-axis + direction to the pattern region Aq, and the center coordinates of the pattern region Ar having the ½ phase shift relationship is not to be searched for based on the circle Cq.

Thus, the pattern extracting unit 12b sets a diameter of a circle as a search range to a predetermined value shorter than ½ of a length of a diagonal of pattern image data. Vertical and lateral sizes of the pattern image data can be said to be substantially similar to vertical and lateral sizes of a pattern region. Therefore, by setting the diameter of the circle as the search range to be a length shorter than ½ of the length of the diagonal of the pattern image data, the two search ranges set using the two pattern regions having the ½ phase shift relationship as the respective search sources, such as the circles Cp and Cq, do not theoretically overlap each other. As a result, due to the search chain described thus far, the pattern extracting unit 12b can store the positional relationship between the pattern regions in the identical phase.

Assuming that the imaging data includes the pattern regions having the ½ phase shift relationship, step S135 and subsequent processing will be described. When the imaging data includes the pattern regions having the ½ phase shift relationship, among the plurality of pattern regions having the center coordinates in FIG. 6, approximately half the pattern regions form a group of the pattern regions in the identical phase (first group), and approximately the remaining pattern regions form a group of the pattern regions in the identical phase, which is a group having the ½ phase shift relationship with the first group (second group).

When the pattern region set to the search source in step S131 happens to be a pattern region belonging to the first group, the pattern extracting unit 12b repeats steps S131 to S134, to store positional relationships among pattern regions belonging to the first group. In step S132, a diameter of a circle as a search range is set to a predetermined value that is shorter than ½ of the length of the diagonal of the pattern image data. When the pattern extracting unit 12b stores adjacent relationships and the like for all the pattern regions belonging to the first group and proceeds to step S135, since a pattern region not set to a search source still remains, the pattern extracting unit 12b proceeds to step S131 from determination of "Yes", and newly sets the search destination pattern region found in the most recent step S133 to a search source.

However, because this new search source pattern region is a pattern region belonging to the first group, a pattern region that can be searched for based on the new search source pattern region is not other than other pattern regions in the first group for which the positional relationships have already been stored, and the search chain is substantially interrupted. When the search chain is interrupted in this way, the pattern extracting unit 12b newly sets any of pattern regions that has not yet been set to a search source to a search source in step S131, and repeats steps S131 to S134. As a result, the pattern extracting unit 12b also stores positional relationships among the pattern regions belonging to the second group.

Therefore, when determining "No" in step S135, the pattern extracting unit 12b can classify pieces of information of the plurality of pattern regions as illustrated in FIG. 6 into the first group and the second group based on presence or absence of a positional relationship. As recognition by the pattern extracting unit 12b, there is no positional relationship between the first group and the second group. Also, depending on extraction accuracy of a pattern region in step S120, center coordinates of a region that does not actually correspond to a pattern represented by pattern image data may be erroneously extracted. The pattern region for which the center coordinates are erroneously extracted in this way is referred to as a false pattern region. In the imaging data, a position of the false pattern region is irregular, and even when the false pattern region is set to a search source, searching for a pattern region of the first group or a pattern region of the second group is not basically successful. Therefore, when determining "No" in step S135, the pattern extracting unit 12b can classify pieces of information of the plurality of pattern regions extracted in step S120 into the first group, the second group, and a group of the false pattern regions.

The pattern extracting unit 12b provides positional relationship information of pattern regions of any one of the groups classified as described above to the printing image generation unit 12c and causes steps S140 and subsequent steps to be performed. Basically, it is sufficient that the pattern extracting unit 12b selects one group in which the number of pattern regions included is the largest, and provides positional relationship information of the pattern regions to the printing image generation unit 12c. The pattern extracting unit 12b, for example, provides positional relationship information of the pattern regions of the first group to the printing image generation unit 12c, and discards the information regarding the second group and the group of false pattern regions. Note that, the number of pattern regions is significantly less in the group of false pattern regions compared to the first group and the second group, so it is easy to determine that information of the group is not to be provided to the printing image generation unit 12c.

In addition to the ½ phase shift illustrated in FIG. 9, examples of the design of the pattern employed for the fabric 30 include, for example, a design constituted by a pattern region having a ⅓ phase shift relationship, or a design constituted by a pattern region having a ¼ phase shift relationship.

Figure 10B:
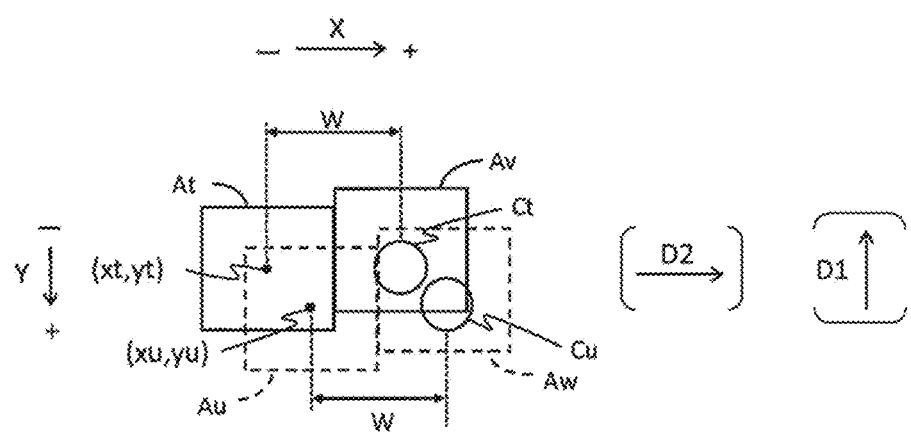
FIG. 10B illustrates pattern regions having a ⅓ phase shift relationship.

In FIG. 10B, several pattern regions having the ⅓ phase shift relationship in imaging data are indicated by solid lines and dashed lines. In FIG. 10B, as in FIG. 10A, a pattern itself is omitted in consideration of ease of visibility. For FIG. 10B, description common to FIG. 10A will be omitted. In FIG. 10B, reference signs At and Av denote two pattern regions At and Av that are pattern regions in an identical phase, and are adjacent in the X-axis + direction to each other, and reference signs Au and Aw denote two pattern regions Au and Aw that are pattern regions in an identical phase and are adjacent in the X-axis + direction to each other. In other words, in FIG. 10B, the pattern regions At and Av, and the pattern regions Au and Aw partially and mutually overlap, and have the ⅓ phase shift relationship where both are shifted from each other by a distance, which is ⅓ of a cycle of the pattern regions, in the transport direction D1 and the width direction D2.

When the pattern region At is set to a search source in step S131, the pattern extracting unit 12b sets, in step S132, a circle Ct centered at a position separated in the X-axis + direction from center coordinates (xt, yt) of the pattern region At by the distance W, to one of search ranges. The circle Ct is a search range for searching for center coordinates of the pattern region Av adjacent in the X-axis + direction to the pattern region At, and center coordinates of the pattern region Aw having the ⅓ phase shift relationship is not to be searched for based on the circle Ct. Similarly, when the pattern region Au is set to a search source in step S131, the pattern extracting unit 12b sets, in step S132, a circle Cu centered at a position separated in the X-axis + direction from center coordinates (xu, yu) of the pattern region Au by the distance W, to one of the search ranges. The circle Cu is a search range for searching for the center coordinates of the pattern region Aw adjacent in the X-axis + direction to the pattern region Au, and the center coordinates of the pattern region Av having the ⅓ phase shift relationship is not to be searched for based on the circle Cu.

Although not illustrated, in the example of FIG. 10B, of course, a group of pattern regions having a relationship of a ⅔ phase shift in relation to the pattern regions At and Av, and having the ⅓ phase shift relationship in relation to the pattern regions Au and Aw, are also present in the imaging data. In FIG. 10B, the pattern extracting unit 12b sets a diameter of a circle as a search range to a predetermined value shorter than ⅓ of a length of a diagonal of the pattern image data. With such a configuration, two search ranges set using the pattern regions having the ⅓ phase shift relationship as respective search sources, such as the circles Ct and Cu, do not theoretically overlap each other. As a result, in step S130, the pattern extracting unit 12b stores positional relationships for a plurality of pattern regions in an identical phase including the pattern regions At and Av (first group), and stores positional relationships for a plurality of pattern regions in an identical phase including the pattern regions Au and Aw (second group), and furthermore, stores positional relationships for a plurality of pattern regions in an identical phase that do not belong to either of the first group and the second group (third group). It is sufficient that the pattern extracting unit 12b provides information of the positional relationships for the pattern regions of any one group of these first to third groups to the printing image generation unit 12c and causes steps S140 and the subsequent steps to be performed.

According to the example of FIGS. 9, 10A and 10B, when imaging data has pattern regions having a 1/J phase shift relationship, the pattern extracting unit 12b, in step S132, determines a diameter D of a circle as a search range to a value satisfying the following equation (1) based on J, and a length L of a diagonal of pattern image data.

$$D < L \times 1/J \qquad (1)$$

Note that, a value of J depends on a design employed for the fabric 30. It is sufficient that the pattern extracting unit 12b can acquire J by any means, and for example, the pattern extracting unit 12b acquires the value of J through an operation of the operation receiving unit 14 by a user.

5. Summary:

In this way, according to the present exemplary embodiment, the printing apparatus 10 includes the transport unit 16 configured to transport the fabric 30 formed with a pattern in the transport direction D1, the imaging unit 15 configured to image the fabric 30 transported by the transport unit 16, the printing unit 17 configured to perform printing on the fabric 30 transported by the transport unit 16, the pattern extracting unit 12b configured to, based on a comparison between first image data representing the pattern and second image data generated by imaging the fabric 30 by the imaging unit 15, extract a pattern region corresponding to the pattern in the second image data, the printing image generation unit 12c configured to arrange third image data representing an image to be printed overlaid on the pattern in accordance with a positional relationship between the pattern regions extracted to generate printing image data, and the printing control unit 12d configured to cause the printing unit 17 to print the printing image data on the fabric 30. Then, the pattern extracting unit 12b performs positional relationship identification processing for setting one of the pattern regions as a search source pattern region, setting, as a search destination pattern region, a pattern region successfully found in a certain range set at a position separated in a predetermined search direction from the search source pattern region by a predetermined distance, and storing information that a position of the search destination pattern region is adjacent in the search direction to the search source pattern region. Furthermore, the pattern extracting unit 12b newly sets the search destination pattern region as the search source pattern region to perform the positional relationship identification processing.

As described above, due to effects of distortion and the like of the fabric 30, pattern regions in second image data are not necessarily aligned methodically in a vertical direction or a lateral direction. In addition, information obtained by extracting pattern regions by step S120 is only a list of center coordinates as illustrated in FIG. 6. Therefore, in the past, it has been difficult to accurately grasp a positional relationship between pattern regions in imaging data. In contrast, according to the present exemplary embodiment, the pattern extracting unit 12b repeats the positional relationship identification processing for storing an adjacent relationship between a search destination pattern region and a search destination pattern region found in a certain range set based on the search source pattern region, by newly setting the search destination pattern region to a search source.

That is, while an alignment of the pattern regions in the second image data is distorted or inclined due to effects of distortion and the like of the fabric 30, as for a positional relationship between adjacent pattern regions, an amount of shift with respect to an ideal positional relationship in the transport direction D1 or the width direction D2 is small, and based on one, another is easily searched for. Therefore, by repeating the positional relationship identification processing as in the present exemplary embodiment, the pattern extracting unit 12b can accurately identify, for a plurality of pattern regions, positional relationships among the pattern regions. Note that, adjacent means adjoining in the specific examples thus far, but may mean a positional relationship where both cannot be said to be in contact, but are next to each other.

In addition, according to the present exemplary embodiment, when N is an integer of 2 or greater, the pattern extracting unit 12b may set, in the positional relationship identification processing, a pattern region successfully found in a certain range set at a position a predetermined distance×N away in a search direction from a search source pattern region, to an N times search destination pattern region, and store that a position of the N times search destination pattern region is N pattern regions ahead, in the search direction, of the search source pattern region.

According to the above-described configuration, it is easy to prevent an interruption in a search chain due to repetition of the positional relationship identification processing.

Additionally, according to the present exemplary embodiment, the pattern extracting unit 12b may perform searching with a vertical direction of second image data as a search direction, and perform searching with a lateral direction of the second image data as the search direction, in the positional relationship identification processing.

According to the above-described configuration, mutual positional relationships can be identified for a plurality of pattern regions repeatedly present two-dimensionally in the second image data.

However, the present exemplary embodiment can also be applied when positional relationships are identified for a plurality of pattern regions aligned one-dimensionally.

Additionally, according to the present exemplary embodiment, when a certain range is a circle, the pattern extracting unit 12b may set a diameter of the circle to be a length shorter than ½ of a length of a diagonal of first image data.

According to the above-described configuration, the pattern extracting unit 12b can exclude, from a search destination, pattern regions having a different phase relationship such as a ½ phase shift and the like in the second image data, search for a pattern region having an identical phase relationship, and store a link between a search source and the search destination.

In addition, according to the present exemplary embodiment, when for all of a plurality of pattern regions extracted from second image data, the pattern region has been at least set to a search source pattern region, or a positional relationship between the pattern region and a search source pattern region has been stored, the pattern extracting unit 12b groups the plurality of pattern regions based on presence or absence of a positional relationship, and when the pattern regions are grouped into a plurality of groups, provides information of a positional relationship among pattern regions of any one group to the printing image generation unit 12c.

According to the above-described configuration, when the second image data includes pattern regions having a different phase relationship, the pattern extracting unit 12b can provide necessary information without waste for generating printing image data to the printing image generation unit 12c.

The present exemplary embodiment also discloses an invention of various categories, such as a system, a program, and a method other than the printing apparatus 10.

A printing method includes a transport step for transporting the fabric 30 formed with a pattern in the transport direction D1, an imaging step for imaging the fabric 30 transported, a pattern extraction step for, based on a comparison between first image data representing the pattern and second image data generated by imaging the fabric 30, extracting a pattern region corresponding to the pattern in the second image data, a printing image generation step for arranging third image data representing an image to be printed overlaid on the pattern in accordance with a positional relationship between the pattern regions extracted to generate printing image data, and a printing step for printing the printing image data on the fabric 30 transported. Then, the pattern extraction step includes performing positional relationship identification processing for setting one of the pattern regions as a search source pattern region, setting, as a search destination pattern region, a pattern region successfully found in a certain range set at a position separated in a predetermined search direction from the search source pattern region by a predetermined distance, and storing information that a position of the search destination pattern region is adjacent to the search source pattern region in the search direction. Furthermore, the pattern extraction step includes newly setting the search destination pattern region as the search source pattern region to perform the positional relationship identification processing.

In the example in FIG. 2A, the configuration of a so-called serial printer has been disclosed in which the printing head 19 is moved while being mounted on the carriage 20, but the printing head 19 may be a so-called line type head. That is, the printing head 19 may be an elongated printing head that is not mounted on the carriage 20 and that can cover a width of the fabric 30 along the width direction D2.

In FIGS. 2A and 2B, the configuration denoted by the reference sign 22 need not be the endless belt, and may be a platen as a platform that supports the fabric 30 from below. That is, it may be understood that the fabric 30 transported by a roller (not illustrated) moves over the platen.

A certain range set as a search range at a position separated from a search source pattern region by a predetermined distance is not limited to a circular shape, and may be, for example, an oval or a polygon.

The present exemplary embodiment can also be applied to a case where a material other than the fabric 30, for example, a paper printing medium, formed with a pattern is used for printing.

What is claimed is:

1. A printing apparatus, comprising:
   a transport unit configured to transport a fabric formed with a pattern in a transport direction;
   an imaging unit configured to image the fabric transported by the transport unit;
   a printing unit configured to perform printing on the fabric transported by the transport unit;
   a pattern extracting unit configured to, based on a comparison between first image data representing the pattern and second image data generated by imaging the fabric by the imaging unit, extract a pattern region corresponding to the pattern in the second image data;
   a printing image generation unit configured to arrange third image data representing an image to be printed overlaid on the pattern in accordance with a positional relationship between the pattern regions extracted, to generate printing image data; and
   a printing control unit configured to cause the printing unit to print the printing image data on the fabric, wherein
   the pattern extracting unit
   performs positional relationship identification processing for setting one of the pattern regions as a search source pattern region, setting, as a search destination pattern region, the pattern region successfully found in a certain range set at a position separated in a predetermined search direction from the search source pattern region by a predetermined distance, and storing information that a position of the search destination pattern region is adjacent in the search direction to the search source pattern region, and newly sets the search destination pattern region as the search source pattern region to perform the positional relationship identification processing.

2. The printing apparatus according to claim 1, wherein when N is an integer of 2 or greater, in the positional relationship identification processing, the pattern extracting unit sets, as an N times search destination pattern region, the pattern region successfully found in a certain range set at a position separated in the search direction from the search source pattern region by a predetermined distance×N, and stores information that a position of the N times search destination pattern region is N pattern regions ahead, in the search direction, of the search source pattern region.

3. The printing apparatus according to claim 1, wherein the pattern extracting unit performs the searching with a vertical direction of the second image data as the search direction, and performs the searching with a lateral direction of the second image data as the search direction, in the positional relationship identification processing.

4. The printing apparatus according to claim 1, wherein when the certain range is a circle, the pattern extracting unit sets a diameter of the circle to be a length shorter than ½ of a length of a diagonal of the first image data.

5. The printing apparatus according to claim 4, wherein the pattern extracting unit when all of a plurality of the pattern regions extracted from the second image data are at least either set as the search source pattern region, or stored with a positional relationship with the search source pattern region, groups the plurality of pattern regions based on presence or absence of a positional relationship, and when the pattern regions are grouped into a plurality of groups, provides information of a positional relationship among the pattern regions of any one group to the printing image generation unit.

6. A printing method, comprising:

a transport step for transporting a fabric formed with a pattern in a transport direction;

an imaging step for imaging the fabric transported;

a pattern extraction step for, based on a comparison between first image data representing the pattern and second image data generated by imaging the fabric, extracting a pattern region corresponding to the pattern in the second image data;

a printing image generation step for arranging third image data representing an image to be printed overlaid on the pattern in accordance with a positional relationship between the pattern regions extracted to generate printing image data; and a printing step for printing the printing image data on the fabric transported, wherein the pattern extraction step includes performing positional relationship identification processing for setting one of the pattern regions as a search source pattern region, setting, as a search destination pattern region, the pattern region successfully found in a certain range set at a position separated in a predetermined search direction from the search source pattern region by a predetermined distance, and storing information that a position of the search destination pattern region is adjacent in the search direction to the search source pattern region, and newly setting the search destination pattern region as the search source pattern region to perform the positional relationship identification processing.

* * * * *